United States Patent
Stiehler

(10) Patent No.: US 10,240,472 B2
(45) Date of Patent: Mar. 26, 2019

(54) BRUSH SEAL FOR A TURBOMACHINE

(71) Applicant: MTU Aero Engines AG, Munich (DE)

(72) Inventor: Frank Stiehler, Bad Liebenwerda (DE)

(73) Assignee: MTU Aero Engines AG, Munich (DE)

( * ) Notice: Subject to any disclaimer, the term of this patent is extended or adjusted under 35 U.S.C. 154(b) by 724 days.

(21) Appl. No.: 14/496,564

(22) Filed: Sep. 25, 2014

(65) Prior Publication Data

US 2015/0093235 A1 Apr. 2, 2015

(30) Foreign Application Priority Data

Sep. 30, 2013 (DE) .......... 10 2013 219 832

(51) Int. Cl.
*F01D 11/00* (2006.01)
*F16J 15/3268* (2016.01)
*F16J 15/3288* (2016.01)

(52) U.S. Cl.
CPC .......... *F01D 11/005* (2013.01); *F01D 11/003* (2013.01); *F16J 15/3268* (2013.01); *F16J 15/3288* (2013.01); *F05D 2240/56* (2013.01); *F05D 2260/38* (2013.01); *F05D 2300/174* (2013.01)

(58) Field of Classification Search
CPC .... F01D 11/001; F01D 11/003; F01D 11/005; F01D 11/006; F01D 11/08; F05D 2300/174; F05D 2260/38; F05D 2240/55; F05D 2240/56; F16J 15/3268; F16J 15/3288
See application file for complete search history.

(56) References Cited

U.S. PATENT DOCUMENTS

| 4,384,822 | A | * | 5/1983 | Schweikl | F01D 9/042 415/115 |
| 4,957,301 | A | * | 9/1990 | Clay, Jr. | B60J 5/14 160/40 |
| 5,076,590 | A | * | 12/1991 | Steinetz | F02K 1/805 239/127.1 |
| 5,265,412 | A | | 11/1993 | Bagepalli et al. | |
| 5,400,586 | A | * | 3/1995 | Bagepalli | F01D 9/023 277/355 |
| 5,639,211 | A | * | 6/1997 | Bintz | F01D 5/10 415/173.7 |
| 5,749,584 | A | * | 5/1998 | Skinner | F01D 9/023 277/355 |
| 6,059,526 | A | * | 5/2000 | Mayr | F01D 11/02 277/355 |
| 6,547,257 | B2 | * | 4/2003 | Cromer | F01D 9/023 277/355 |

(Continued)

FOREIGN PATENT DOCUMENTS

DE 3708949 A1 9/1987
DE 296 00 193 U1 4/1996
(Continued)

*Primary Examiner* — Ninh H. Nguyen
*Assistant Examiner* — Wayne A Lambert
(74) *Attorney, Agent, or Firm* — Barlow, Josephs & Holmes, Ltd.

(57) ABSTRACT

A brush seal for a turbomachine includes a support that has a recess, in which a spring element is clamped axially, which fastens a brush element, where the spring element is axially locked at an undercut in the recess.

12 Claims, 1 Drawing Sheet

(56) References Cited

U.S. PATENT DOCUMENTS

| | | | | |
|---|---|---|---|---|
| 6,799,766 | B2* | 10/2004 | Crudgington | F16J 15/3288 |
| | | | | 277/355 |
| 6,913,265 | B2* | 7/2005 | Datta | F16J 15/3288 |
| | | | | 277/355 |
| 7,165,771 | B2* | 1/2007 | Beichl | F16J 15/3288 |
| | | | | 277/355 |
| 7,181,843 | B1* | 2/2007 | Tabbita | A46B 3/06 |
| | | | | 156/72 |
| 7,445,212 | B2* | 11/2008 | Gail | F16J 15/3288 |
| | | | | 277/355 |
| 2005/0110218 | A1 | 5/2005 | Morrison et al. | |
| 2005/0151324 | A1 | 7/2005 | Plona et al. | |
| 2008/0042366 | A1* | 2/2008 | Awtar | F01D 11/003 |
| | | | | 277/411 |
| 2008/0267770 | A1* | 10/2008 | Webster | F01D 11/005 |
| | | | | 415/173.1 |

FOREIGN PATENT DOCUMENTS

| | | | |
|---|---|---|---|
| DE | 10018273 | A1 | 10/2001 |
| EP | 2626601 | A1 | 8/2013 |
| GB | 2188121 | A | 9/1987 |
| JP | 2009281437 | A | 12/2009 |

* cited by examiner

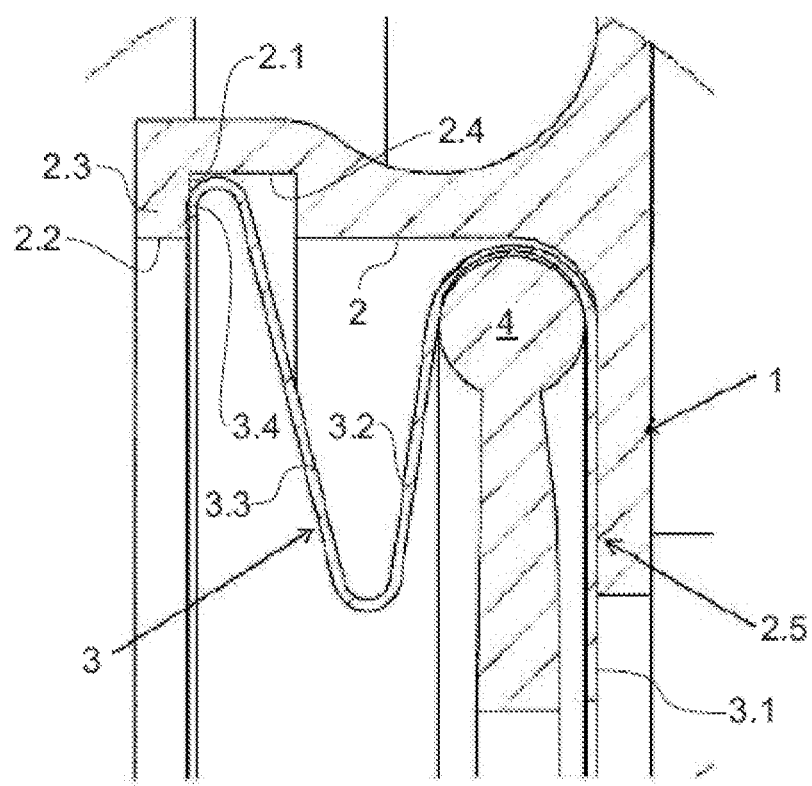

BRUSH SEAL FOR A TURBOMACHINE

BACKGROUND OF THE INVENTION

The present invention relates to a brush seal for a turbomachine, a turbomachine, in particular, a gas turbine, having such a brush seal, as well as a method for mounting such a brush seal.

BRIEF SUMMARY OF THE INVENTION

A brush seal for sealing a gap between a rotor-stator arrangement by means of bristles that are held by a clamping ring is known from DE 296 00 193 U1. The clamping ring or a seal housing receiving the ring is clamped between a shoulder of a recess of a stator housing and a separate wall that is welded to the stator housing.

An object of an embodiment of the present invention is to make available an improved brush seal for a turbomachine, in particular, to improve the mounting and/or the demounting thereof.

This object is achieved by a brush seal of the present invention. Also provided by the present invention is a turbomachine having a corresponding brush seal or a method for mounting a corresponding brush seal.

According to an aspect of the present invention, a turbomachine has a brush seal with a carrier or support.

In particular, the turbomachine can be a gas turbine, preferably a gas turbine of an aircraft engine. In one embodiment, it has a rotor and a housing. The brush seal can be disposed, in particular, in a compressor stage or a turbine stage of the gas turbine.

In one embodiment, the support is a support rigidly fastened to the housing. In particular, it can be part of the housing itself. Similarly, in one embodiment, it can be an inner shroud of a guide vane structure rigidly attached to the housing or it can be joined to such a structure, in particular, permanently or detachably.

The support of a brush seal according to the invention has a recess that is preferably annular and/or open axially on one or both sides, and a spring element is clamped axially in this recess, the spring element in turn fastening a brush element that in one embodiment contacts the rotor, particularly in a sealing manner. The brush seal can thus form, in particular, a radially inner air seal ("inner air seal") of a compressor stage or a turbine stage of a gas turbine.

In one embodiment, the brush element has several bristles, particularly made of metal and/or plastic. In one embodiment, these bristles can be wrapped around a core or also can be combined on the side facing away from the rotor, in particular, can be joined cohesively or can be clamped by friction-fit.

According to an aspect of the present invention, the spring element is axially locked at an undercut in the recess. It is understood presently, particularly in the usual way for persons in the field, that the spring element in the locked state has a greater outer diameter than a radially inner edge of the undercut, and is supported axially at the undercut by this edge and thus the spring element that is elastically compressed in the axial direction is clamped. In the sense of the present invention, an axial direction can particularly be aligned with a lengthwise axis, in particular an axis of symmetry or an axis of rotation of the brush seal or turbomachine; a radial direction can be oriented correspondingly perpendicular thereto.

By locking the spring element at the undercut in the axial direction and by supporting it axially therein, in one embodiment of the structure, the mounting and/or demounting of the brush seal can be simplified and/or its function can be improved. In particular, in one embodiment, the spring element can be compressed preferably elastically in the radial direction, introduced into the recess, and in this recess, can be expanded, in particular automatically with complete or partial elastic relaxation in the radial direction, behind the undercut, and clamped axially therein against the undercut, and thus can be locked axially in it. Thus, in an advantageous embodiment, a separate wall to be connected cohesively to the support can be omitted.

In one embodiment, the recess has an introduction opening for introducing, particularly in the axial direction, the spring element that has been elastically compressed in the radial direction for this purpose, and that is subsequently radially expanded in comparison to its configuration when introduced, and thus is locked with the undercut and supported at the latter. Correspondingly, in one embodiment, a circumference of the introduction opening is smaller than a (maximum) outer circumference of the spring element clamped in the recess, in particular, smaller than an outer circumference of the spring element, with which the latter is locked at the undercut.

In one embodiment, the undercut can be formed by an axial front side of a radial collar of the recess, this collar preferably being designed in one piece with the support, and/or defining the introduction opening. In particular, the recess can have a radial groove, the axial extent of which, in one enhancement, amounts to at most half of the axial extent of the recess and/or of the spring element, and an axial front side of which forms the undercut. In particular, an advantageous locking with little weakening of the material can be shown by such a narrow radial groove relative to the recess or the spring element. In one embodiment, the undercut can be at least essentially perpendicular to the axial direction, in particular, in order to advantageously support the spring element. In one embodiment, a groove depth of the radial groove amounts to at least double and/or at most 20 times a wall thickness, especially a maximum or minimum wall thickness, of the spring element. In one embodiment, an advantageous locking matched to the spring element can be shown by this. Correspondingly, in one embodiment, an outer circumference of the spring element with which the spring element is locked at the undercut or supported axially at the undercut, protrudes beyond a (maximum) outer circumference of the brush element in the radial direction.

In one embodiment, the spring element is or will be friction-fitted in the recess also in the radial direction due to its axial clamping. Likewise, it can be fastened in form-fitting manner in the recess, in particular in the way explained below.

In one embodiment, the spring element has a first leg, a second leg adjacent to the first, and a third leg adjacent to the second. In an enhancement, the spring element has a fourth leg adjacent to the third leg; thus, it can be formed in Z or W shape, in particular, or have such a segment.

In one embodiment, in particular, the brush element is fastened cohesively and/or in a form-fitting manner and/or friction-fit, in particular, clamped between the first leg and the second leg. Thus, in one embodiment, the brush element also can be fastened (more strongly) by the axial clamping of the spring element.

Additionally or alternatively, the first leg can be supported axially at a shoulder of the recess, and thus the spring element can be axially clamped. In this way, in one embodiment, the first leg can function equally as the axial support of the spring element and for fastening the brush element.

Additionally or alternatively, the fourth leg can be axially supported at the undercut. In this way, an advantageous elastic deformation characteristic can be shown, in particular, by a W-shaped spring element. In an enhancement, the fourth leg can be shortened in relation to the other legs; in particular, it can terminate radially above an edge delimiting the undercut, in particular, the introduction opening.

In one embodiment, the spring element can be supported in form-fitting manner radially in the recess with a transition region between the first leg and the second leg and/or with a transition region between the third leg and the fourth leg.

In one embodiment, the brush element, which is preferably ring-shaped, is designed in one piece, which can particularly improve the stability. In another embodiment, the multi-part brush element is composed annularly of several segments that are preferably joined permanently or detachably, which can, in particular, facilitate the (de)mounting.

In one embodiment, the spring element, which is preferably ring-shaped, can also be designed in one piece, which can particularly improve the stability. In another embodiment, the multi-part spring element is composed annularly of several segments that are preferably joined permanently or detachably, which can, in particular, facilitate the (de)mounting.

In one embodiment, the spring element comprises metal or is designed metallic. In one embodiment, the spring element is coated, preferably by electroplating. In this way, the contact pairing with the recess can be improved.

In one embodiment, the support is produced from a titanium-aluminum alloy. Such a support is usually pressure-sensitive, so that the locking of the spring element according to the invention can be advantageous, in particular, when compared to a screw connection, rivet, or the like.

For mounting a brush seal, according to an aspect of the present invention, the spring element is introduced into the recess, in particular, under elastic, radial compression, and is locked therein under partial or complete elastic relaxation in the radial direction at the undercut, at which it is supported and is elastically clamped thereby, in order to fasten the spring element in the recess.

BRIEF DESCRIPTION OF THE DRAWINGS

Additional advantageous enhancements of the present invention can be taken from the dependent claims and the following description of preferred embodiments. For this purpose and partially schematized, the single FIGURE herein:

FIG. 1 shows a part of a brush seal of a gas turbine according to an embodiment of the present invention in a meridian section.

DETAILED DESCRIPTION OF THE INVENTION

FIG. 1 shows a part of a brush seal of a gas turbine with a rotor and a housing (not shown) according to an embodiment of the present invention in a meridian section.

The brush seal has a support 1, which is attached to the housing, the support having an annular recess 2, which is open axially on both sides, in which a spring element 3 is axially clamped (horizontally in FIG. 1), which in turn fastens a brush element 4 that contacts the rotor in a sealing manner (not shown).

The spring element is axially locked at an undercut 2.1 in the recess in that, in the locked state shown in FIG. 1, it has a greater outer diameter than a radially inner edge of the undercut, and is supported axially at the undercut by this and thus the spring element that is elastically compressed in the axial direction is clamped.

The recess has an introduction opening 2.2 for introducing in the axial direction the spring element that has been elastically compressed in the radial direction for this, and that is subsequently radially expanded in comparison to its configuration when introduced, and thus is locked with the undercut and supported at the latter. Correspondingly, a circumference of the introduction opening is smaller than the outer circumference of the spring element, with which it is locked at the undercut.

The undercut 2.1 is formed by an axial front side of a radial collar 2.3 of the recess, the collar being designed in one piece with the support and defining the introduction opening. The recess has a radial groove 2.4 for this, the axial extent of which (from left to right in FIG. 1) amounts to less than half of the axial extent of the recess and of the spring element, and an axial front side of which forms the undercut 2.1, which is perpendicular to the axial direction. A groove depth of the radial groove amounts to more than double and less than 20 times the wall thickness of the spring element. Correspondingly, the outer circumference of the spring element with which it is locked at the undercut or supported axially at the undercut, protrudes beyond an outer circumference of the brush element 4 in the radial direction.

The spring element 3 has a first leg 3.1, a second leg 3.2 adjacent to the first, a third leg 3.3 adjacent to the second, and a fourth leg 3.4 adjacent to the third, and is thus designed in a W shape.

The brush element 4 is clamped between the first leg 3.1 and the second leg 3.2.

The first leg 3.1 is axially supported at a shoulder 2.5 of the recess and thus clamps the spring element axially.

The fourth leg 3.4 is supported axially at the undercut 2.1, and is shortened in comparison to the other legs 3.1-3.3, so that it terminates radially above the introduction opening 2.2.

The spring element is supported in a form-fitting manner by a transition region between the third and the fourth legs radially in the radial groove 2.4 of the recess.

For mounting the brush seal, the spring element is introduced into the recess under elastic radial compression and locked therein under partial elastic relaxation in the radial direction at the undercut, at which it is supported and is axially elastically clamped thereby, in order to fasten the spring element in the recess.

In particular, the second leg 3.2 can be moved in the direction toward the first leg 3.1 of the spring element 3 when the brush seal is mounted by applying a compressive force. In this way, the third leg 3.3 inclines more toward the axis of the turbomachine, whereby the radial extent of the transition region between the third leg 3.3 and the fourth leg 3.4 is reduced. In other words, the transition region between the third leg 3.3 and the fourth leg 3.4 in FIG. 1 migrates downward. Thus, it can slide in the axial direction through the introduction opening and after this can expand again in the radial direction due to the elastic spring force in order to be locked in the radial groove 2.4. The rounded shape of the transition region between the adjacent third leg 3.3 and fourth leg 3.4 in this case favors the introduction of the brush seal or the spring element 3 into the recess 2. The essentially W-shaped design of the spring element 2 also promotes the elastic deformability of the spring element supporting the mounting or demounting, both in the radial direction as well as also in the axial direction. The mounting or demounting can thus be carried out very simply, it not being necessary to design the brush seal in multiple parts. Rather, it can be designed in the form of a closed ring, which is advantageous with respect to the stability and the effort required in mounting. A weld, screw connection, rivet, or the like is not necessary for the mounting of the brush element. Nevertheless, a secure holding of the brush seal in the support 1 is assured.

Although exemplary embodiments were explained in the preceding description, it shall be noted that a plurality of modifications is possible. In addition, it shall be noted that the exemplary embodiments only involve examples that in no way shall limit the scope of protection, the applications and the structure. Rather, guidelines are given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

LIST OF REFERENCE NUMBERS

1 Support
2 Recess
2.1 Undercut
2.2 Introduction opening
2.3 Radial collar
2.4 Radial groove
2.5 Shoulder
3 Spring element
3.1 First leg
3.2 Second leg
3.3 Third leg
3.4 Fourth leg
4 Brush element

The invention claimed is:

1. A brush seal for a turbomachine, comprising:
a carrier that has a recess in which a spring element is axially braced that immobilizes a brush element, the spring element being axially latched against an undercut in the recess,
wherein the spring element comprises
a first leg having a first end and a second end,
a second leg having a first end and a second end, wherein the first end of the second leg is interconnected with said second end of said first leg,
a third leg having a first end and a second end, wherein the first end of the third leg is interconnected with said second end of said second leg, and
a fourth leg having a first end and a second end, wherein the first end of the fourth leg is interconnected with said second end of said third leg;
the brush element being clamped between the first and second legs, wherein the fourth leg braces against the undercut.

2. The brush seal according to claim 1, wherein the spring element is radially immobilized in the recess by frictional engagement or positive-locking.

3. The brush seal according to claim 1, wherein the recess has an insertion opening for insertion of the subsequently radially expanding spring element.

4. The brush seal according to claim 3, wherein the first leg braces axially against a shoulder of the recess.

5. The brush seal according to claim 4, wherein the spring element braces radially against a transition area between the first and second legs and/or against a transition area between the third and fourth legs in the recess.

6. The brush seal according to claim 3, wherein the spring element braces radially against a transition area between the first and second legs and/or against a transition area between the third and fourth legs in the recess.

7. The brush seal according to claim 1, wherein the brush element and/or spring element is configured in one part or in several parts.

8. The brush seal according to claim 1, wherein the spring element is made of metal and is electroplated.

9. The brush seal according to claim 1, wherein the carrier is made of a titanium-aluminum alloy.

10. The brush seal according to claim 1, wherein the brush element contacts a rotor of a turbomachine.

11. The brush seal according to claim 10, wherein the turbomachine is a gas turbine.

12. The brush seal according to claim 1, wherein the spring element is inserted into the recess and latched against the undercut.

* * * * *